United States Patent
Cunningham

(10) Patent No.: US 11,263,542 B2
(45) Date of Patent: Mar. 1, 2022

(54) TECHNOLOGIES FOR AUTO DISCOVER AND CONNECT TO A REST INTERFACE

(71) Applicant: Interactive Intelligence Group, Inc., Indianapolis, IN (US)

(72) Inventor: Gregory P. Cunningham, Zionsville, IN (US)

(*) Notice: Subject to any disclaimer, the term of this patent is extended or adjusted under 35 U.S.C. 154(b) by 814 days.

(21) Appl. No.: 15/467,755

(22) Filed: Mar. 23, 2017

(65) Prior Publication Data
US 2017/0278005 A1 Sep. 28, 2017

Related U.S. Application Data

(60) Provisional application No. 62/311,956, filed on Mar. 23, 2016.

(51) Int. Cl.
| | | |
|---|---|---|
| G06N 5/04 | (2006.01) | |
| G06F 16/00 | (2019.01) | |
| G06F 16/958 | (2019.01) | |
| G06N 7/00 | (2006.01) | |

(52) U.S. Cl.
CPC ............ *G06N 5/047* (2013.01); *G06F 16/00* (2019.01); *G06F 16/958* (2019.01); *G06N 7/005* (2013.01)

(58) Field of Classification Search
CPC ........ G06N 5/047; G06N 7/005; G06F 16/00; G06F 16/958
See application file for complete search history.

(56) References Cited

U.S. PATENT DOCUMENTS

| | | | | |
|---|---|---|---|---|
| 8,526,743 | B1* | 9/2013 | Campbell | G06K 9/6202 382/181 |
| 8,745,641 | B1* | 6/2014 | Coker | G06F 11/3668 719/328 |
| 2002/0161757 | A1* | 10/2002 | Mock | G06F 16/24 |
| 2010/0145946 | A1 | 6/2010 | Conrad et al. | |
| 2011/0119268 | A1 | 5/2011 | Rajaram et al. | |
| 2012/0173607 | A1 | 7/2012 | Connan et al. | |
| 2015/0121401 | A1 | 4/2015 | Laredo et al. | |
| 2015/0195121 | A1 | 7/2015 | Bragstad et al. | |
| 2015/0248500 | A1* | 9/2015 | Duke | G06F 17/277 707/755 |

(Continued)

OTHER PUBLICATIONS

International Searching Authority, International Search Report for PCT/US2017/023887, dated Jun. 5, 2017.

(Continued)

*Primary Examiner* — Li B. Zhen
*Assistant Examiner* — Tewodros E Mengistu

(57) ABSTRACT

Technologies for automatic discovery and connection to a representational state transfer (REST) interface include a provider computing device communicatively coupled to a REST interface of a Web service hosted by a 3$^{rd}$ party. The provider computing device is configured to analyze a data representation received from a REST interface of a Web service in response to having transmitted an HTTP request to an endpoint of the Web service and determine a pattern of the data representation as a function of the analysis of the data representation. Additionally, the provider computing device is configured to generate one or more possible schemas for the REST interface based on the determined pattern. Additional embodiments are described herein.

18 Claims, 5 Drawing Sheets

(56) References Cited

U.S. PATENT DOCUMENTS

2015/0378684 A1* 12/2015 Kaplinger ............... G06F 16/00
717/104

OTHER PUBLICATIONS

International Searching Authority, Written Opinion for PCT/US2017/023887, dated Jun. 5, 2017.
Australian Government IP Australia Examination Report No. 1 for Application No. 2017237089, dated Apr. 26, 2019, 3 pages.
New Zealand Intellectual Property Office First Examination Report for Application No. 746293, dated Mar. 20, 2019, 3 pages.
Canadian Office Action for Application No. 3,017,523, dated Jul. 16, 2019, 3 pages.
Chang, Chia-Hui et al.; Automatic information extraction from semi-structured Web pages by pattern discovery, Decision Support Systems, Elsevier, Apr. 1, 2003, 19 pages.
Extended European Search Report for Application No. 17771187.6, dated Nov. 30, 2018, 9 pages.
New Zealand Intellectual Property Office Further Examination Report for Application No. 746293, dated Oct. 17, 2019, 5 pages.
New Zealand Intellectual Property Office Further Examination Report for corresponding Application No. 746293, dated Jan. 31, 2020, 6 pages.
Canadian Patent Office Action for corresponding Application No. 3,017,523, dated Jun. 26, 2020, 4 pages.
Canadian Patent Office Action for corresponding Application No. 3,017,523, dated Apr. 7, 2021, 4 pages.

\* cited by examiner

TECHNOLOGIES FOR AUTO DISCOVER AND CONNECT TO A REST INTERFACE

CROSS REFERENCE TO RELATED APPLICATIONS

The present application is related to, and claims the priority benefit of, U.S. Provisional Patent Application Ser. No. 62/311,956 filed Mar. 23, 2016, the contents of which are hereby incorporated in their entirety into the present disclosure.

BACKGROUND OF THE DISCLOSED EMBODIMENTS

Representational state transfer (REST) has become a pervasive technology for networked hypermedia applications, such as Web applications. REST or RESTful Web services provide interoperability between computer systems on the Internet, allowing requesting systems to access and manipulate textual representations of Web resources using a uniform and predefined set of stateless operations. As a result, RESTful Web services are typically lighter weight than alternative Web services, as well as generally being considered more easily maintainable and scalable. Nearly all RESTful Web services rely on Hypertext Transfer Protocol (HTTP) as their underlying application protocol.

RESTful Web services are resource-based rather than action-based (e.g., nouns rather than verbs). Web resources are those resources that can be identified, named, addressed, or otherwise handled on the Web, such as media (e.g., pictures, videos, etc.), web pages, information, etc. The Web resources can be accessed via a Uniform Resource Indicator (URI) of the resource. In a RESTful Web service, requests made to a resource's URI will elicit a response that includes a representation of the requested resource (i.e., a resource representation), which may be in Extensible Markup Language (XML), Hypertext Markup Language (HTML), JavaScript Object Notation (JSON) or some other defined format. The resource representation can include data, links to other resources, etc.

A request will need to identify the resource(s) that the request is looking for (e.g., via a URI or a uniform resource locator (URL)). While the RESTful architecture defines a uniform interface that constrains the identification of resources, the interface, resource naming convention, and types of resources accessible via the interface are generally expected to be known prior to requesting the resources. As such, present technologies typically require the hard-coding of parameters (e.g., query, resource, etc.), patterns, common objects, etc., to the URIs used to access the resources (e.g., via a HTTP GET method).

In practice, an application development company may integrate data and/or functionality from one application program together with that of another application program, a process commonly referred to as application integration (sometimes referred to as enterprise application integration (EAI)). As such, the application development company can develop a custom software solution that interfaces with one or more other network applications, or Web services. This is generally implemented via a bus/hub connected to applications through a set of adapters, or connectors (i.e., programs that interface with an underlying application). Such connectors typically rely on an application-independent, or common, data format, such that the connectors do not have to perform data conversions of $3^{rd}$ party applications' formats.

However, in practical application, the data format may not be known and/or the location of said data relative to its associated endpoint may not be known without further manual discovery. In other words, as the resource representation schema can be defined by the architect, administrator, etc., of the $3^{rd}$ party application, there may not be a "common" format and/or path to the data. As such, one may not be able to discover a REST interface and access resources without prior knowledge of the interface and the resources. Accordingly, there exists a need for improvements in technologies for auto discover and connect to a REST interface.

SUMMARY OF THE DISCLOSED EMBODIMENTS

In one aspect, a method for automatic discovery and connection to a representational state transfer (REST) interface includes analyzing, by a provider computing device, a data representation received from a REST interface of a Web service in response to having transmitted an HTTP request to an endpoint of the Web service; determining, by the provider computing device, a pattern of the data representation as a function of the analysis of the data representation; assigning, by the provider computing device, a level of confidence in the pattern as a function of the analysis of the data representation and the determined pattern; and generating, by the provider computing device and subsequent to a determination that the level of confidence in the pattern is greater than or equal to a corresponding confidence threshold, one or more possible schemas for the REST interface as a function of the determined pattern.

In some embodiments, the method further includes identifying, by the provider computing device and subsequent to a determination that the level of confidence in the pattern is greater than or equal to a corresponding confidence threshold, one or more key values for the data representation as a function of the determined patter, wherein generating the one or more possible schemas for the REST interface comprises generating the one or more possible schemas for the REST interface as a function of the identified key values.

In some embodiments, analyzing the data representation comprises (i) identifying data of the data representation that is usable to identify a main data set, (ii) analyzing multiple records of the data set for data members to find an inclusive set of possible data, and (iii) analyzing data field paths of the data to determine one or more probably data types usable to identify the main data set. In other embodiments, identifying data of the data representation that is usable to identify the main data set comprises searching for a repeating set of data in the data representation. In still other embodiments, identifying data of the data representation that is usable to identify the main data set comprises searching for one or more standard paged control fields, such as, but not limited to, a count, a number, an offset, a start, an end, etc. It should be appreciated that paged control fields may refer to paged or chunked data control fields, as well as any other types of control fields usable to fetch large sets of data as a sequence of smaller chunks.

In some embodiments, analyzing the data representation further comprises determining a possible set of identifiers based on data fields which fit a known pattern of identifiers and analyzing the identifiers to determine a possible unique identifier for each set of data. In other embodiments, analyzing the data representation further comprises validating the determined possible unique identifiers. In still other embodiments, validating the determined possible unique identifiers comprises transmitting one or more additional HTTP requests to the endpoint of the Web service based on the determined possible unique identifiers and analyzing the returned data representations associated with the one or more additional HTTP requests. In yet other embodiments, the HTTP request comprises one of an HTTP GET request and an HTTP POST request.

In another aspect, a provider computing device for automatic discovery and connection to a representational state transfer (REST) interface includes one or more computer-readable medium comprising instructions and one or more processors coupled with the one or more computer-readable medium and configured to execute the instructions to: analyze a data representation received from a REST interface of a Web service in response to having transmitted an HTTP request to an endpoint of the Web service; determine a pattern of the data representation as a function of the analysis of the data representation; assign a level of confidence in the pattern as a function of the analysis of the data representation and the determined pattern; and generate, subsequent to a determination that the level of confidence in the pattern is greater than or equal to a corresponding confidence threshold, one or more possible schemas for the REST interface as a function of the determined pattern.

In some embodiments, the one or more processors are further configured to execute the instructions to identify, subsequent to a determination that the level of confidence in the pattern is greater than or equal to a corresponding confidence threshold, one or more key values for the data representation as a function of the determined patter, wherein to generate the one or more possible schemas for the REST interface comprises to generate the one or more possible schemas for the REST interface as a function of the identified key values.

In some embodiments, to analyze the data representation comprises to (i) identify data of the data representation that is usable to identify a main data set, (ii) analyze multiple records of the data set for data members to find an inclusive set of possible data, and (iii) analyze data field paths of the data to determine one or more probably data types usable to identify the main data set. In other embodiments, to identify data of the data representation that is usable to identify the main data set comprises to search for a repeating set of data in the data representation. In still other embodiments, to identify data of the data representation that is usable to identify the main data set comprises to search for one or more standard paged control fields.

In some embodiments, to analyze the data representation further comprises to determine a possible set of identifiers based on data fields which fit a known pattern of identifiers and analyze the identifiers to determine a possible unique identifier for each set of data. In other embodiments, to analyze the data representation further comprises to validate the determined possible unique identifiers. In still other embodiments, to validate the determined possible unique identifiers comprises to transmit one or more additional HTTP requests to the endpoint of the Web service based on the determined possible unique identifiers and analyze the returned data representations associated with the one or more additional HTTP requests. In yet other embodiments, the HTTP request comprises one of an HTTP GET request and an HTTP POST request.

BRIEF DESCRIPTION OF DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
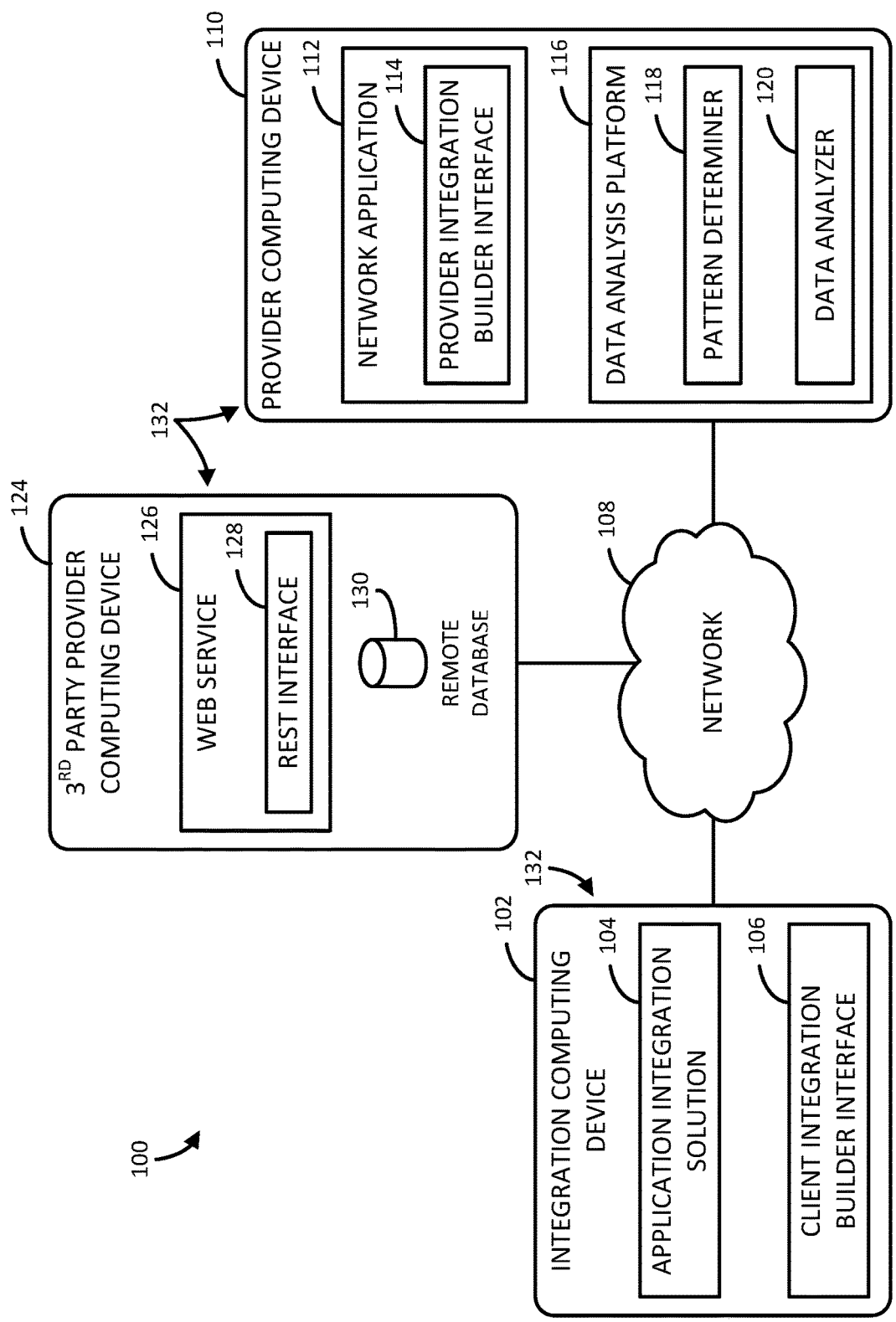
FIG. 1 is a simplified block diagram of at least one embodiment of a system for automatic discovery and connection to a representational state transfer (REST) interface that includes a consumer computing device and a provider computing device in a client-server architecture.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 is an illustrative system 100 for automatic discovery and connection to a representational state transfer (REST) interface that includes an integration computing device 102 and a provider computing device 110 communicatively coupled via a network 108. The illustrative integration computing device 102 includes an application integration solution 104 and a client integration builder interface. The illustrative provider computing device 110 includes a network application 112 and a data analysis platform 116. The illustrative system 100 additionally includes a 3rd party provider computing device 124, which is also communicatively coupled to the provider computing device 110 via the network 108. The illustrative 3rd party provider computing device 124 includes a Web service 126 and a remote database 130.

In use, the client integration builder interface 106 of the integration computing device 102 is configured to interface with the network application 112 of the provider computing device 110, or more particularly is configured to interface with a provider integration builder interface 114 of the network application 112. Similarly, the network application 112 is configured to interface with the Web service 126, or more particularly the provider integration builder interface 114 of the network application 112 is configured to interface with a REST interface 128 of the Web service 126.

In an illustrative example, a network application integrator (e.g., an application developer) may be tasked with developing an application integration solution (e.g., application integration solution 104) that interfaces with the network application 112. Additionally, the network application 112 may be additionally required to interface with the Web service 126 of the 3rd party provider computing device 124 in order to retrieve resource data (e.g., media, web pages, information, etc.), such as may be retrieved from the remote database 130 of the 3rd party provider computing device 124, and/or perform a particular function that is reliant on at least a portion of the retrieved data. For example, the function(s) may include taking an action as a function of the retrieved data (e.g., making a phone call, sending an email, updating a log, etc.), presenting the data to a user of the integration application in a visual, readable format, etc.

Accordingly, the network application 112 is configured to retrieve the data accessible via the REST interface. To do so, the network application 112 is configured receive information from the application integration solution 104 that is usable to retrieve the necessary data. However, the schema (i.e., the organizational structure of the data) may not be known by the network application integrator. It should be appreciated that while the data referred to herein is illustratively shown as being stored in the remote database 130, the data may not be stored in a database in some embodiments. Accordingly, in such embodiments, the schema may not be referring to a database schema (e.g., schema may be referring to locations relative to a file structure).

To ascertain the schema, a discovery may be performed. However, unlike traditional, manual discovery techniques, the provider integration builder interface 114 is configured to perform the discovery and connection to the REST interface 128 of the Web service 126 automatically. To do so, the provider integration builder interface 114 is configured to receive, from the network application integrator via the client integration builder interface 106, a uniform resource locator (URL) or uniform resource identifier (URI) corresponding to an endpoint of the Web service 126. It should be appreciated that while a URI or a URL may be received, the resource locator/identifier will be referred to herein as a URL for clarity of the description.

Figure 3A:
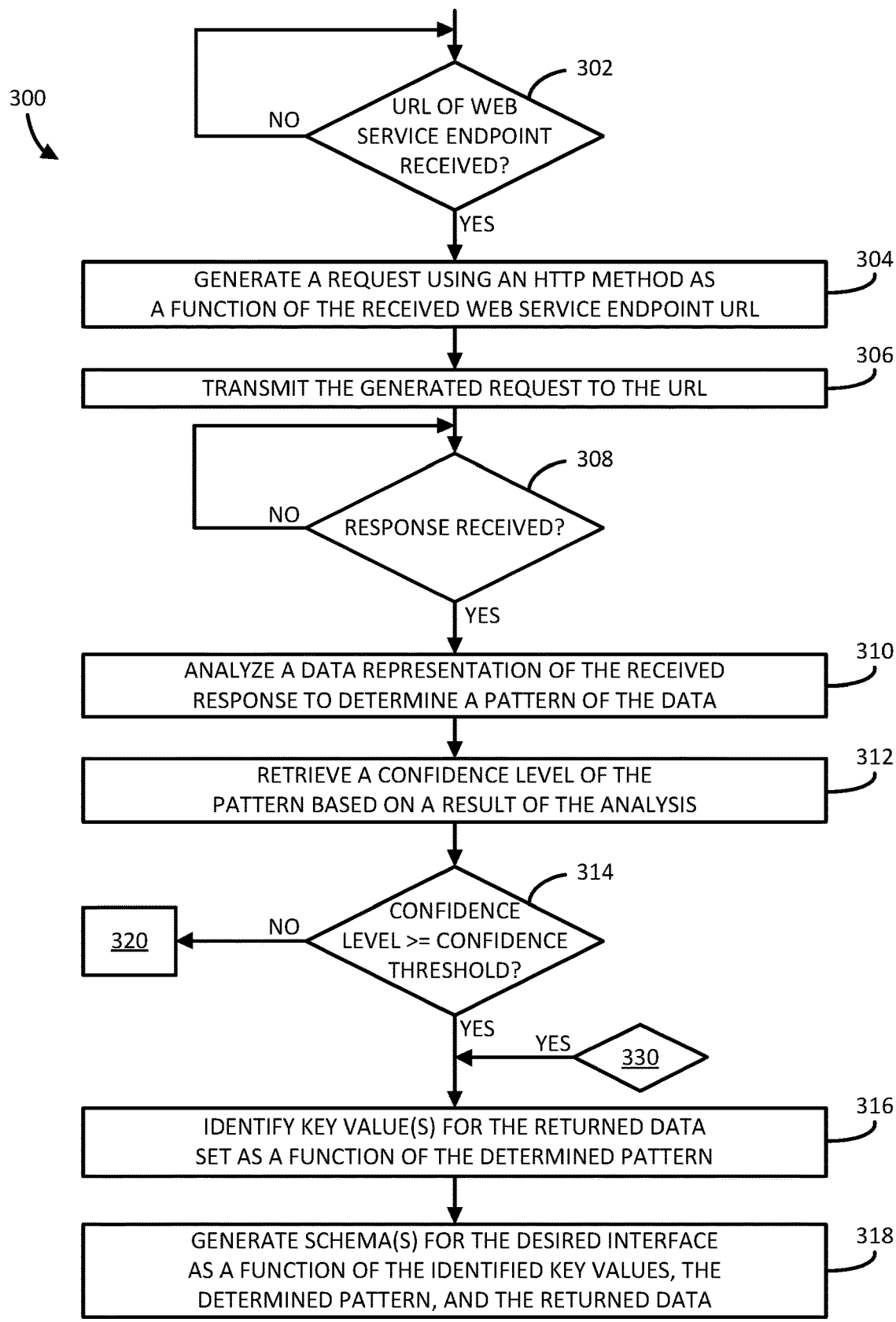
FIGS. 3A and 3B are a simplified flow diagram of at least one embodiment of a method for automatically discovering and connecting to a REST interface that may be executed by the remote computing device of FIGS. 1 and 2.
Figure 3B:
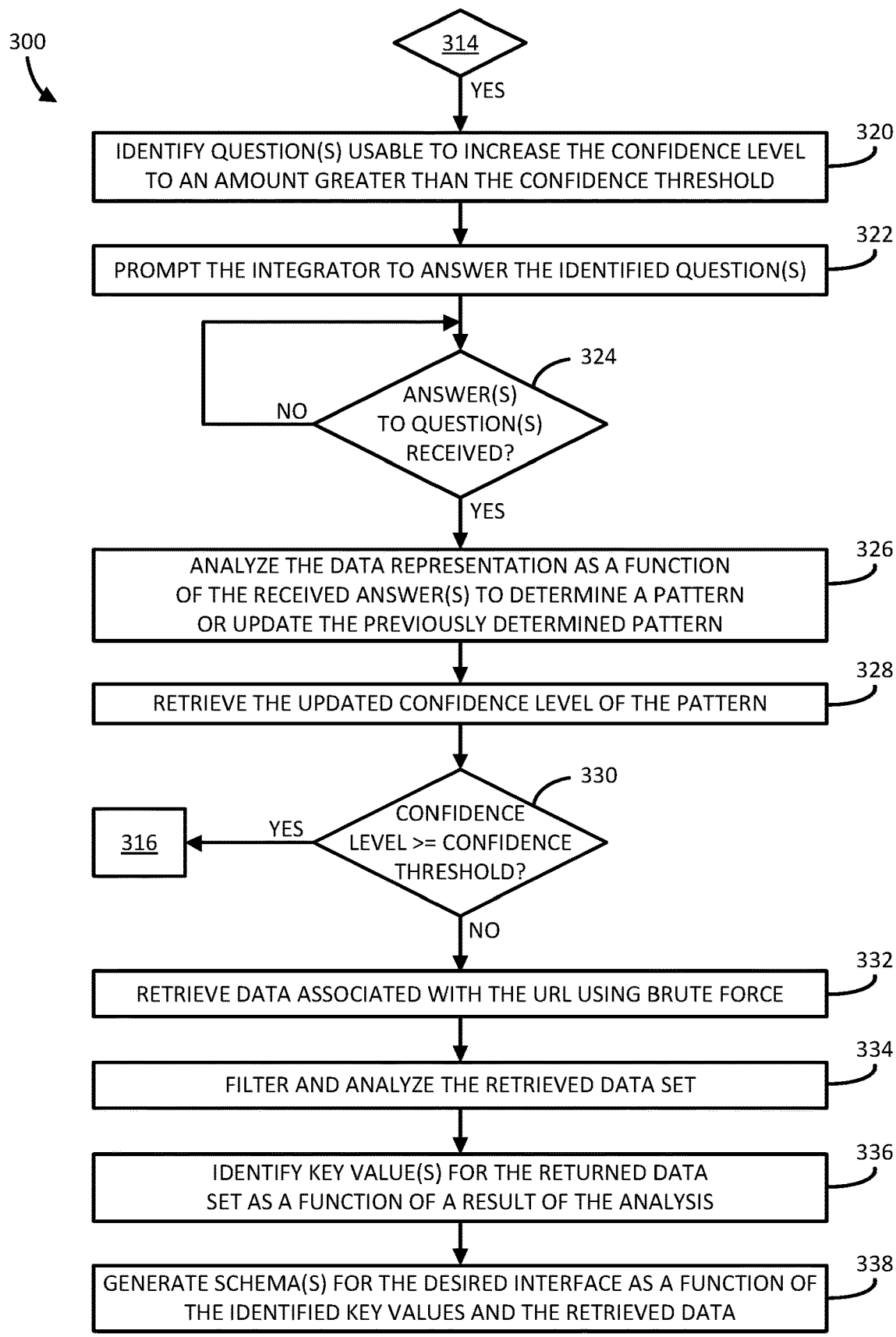
Figure 4:
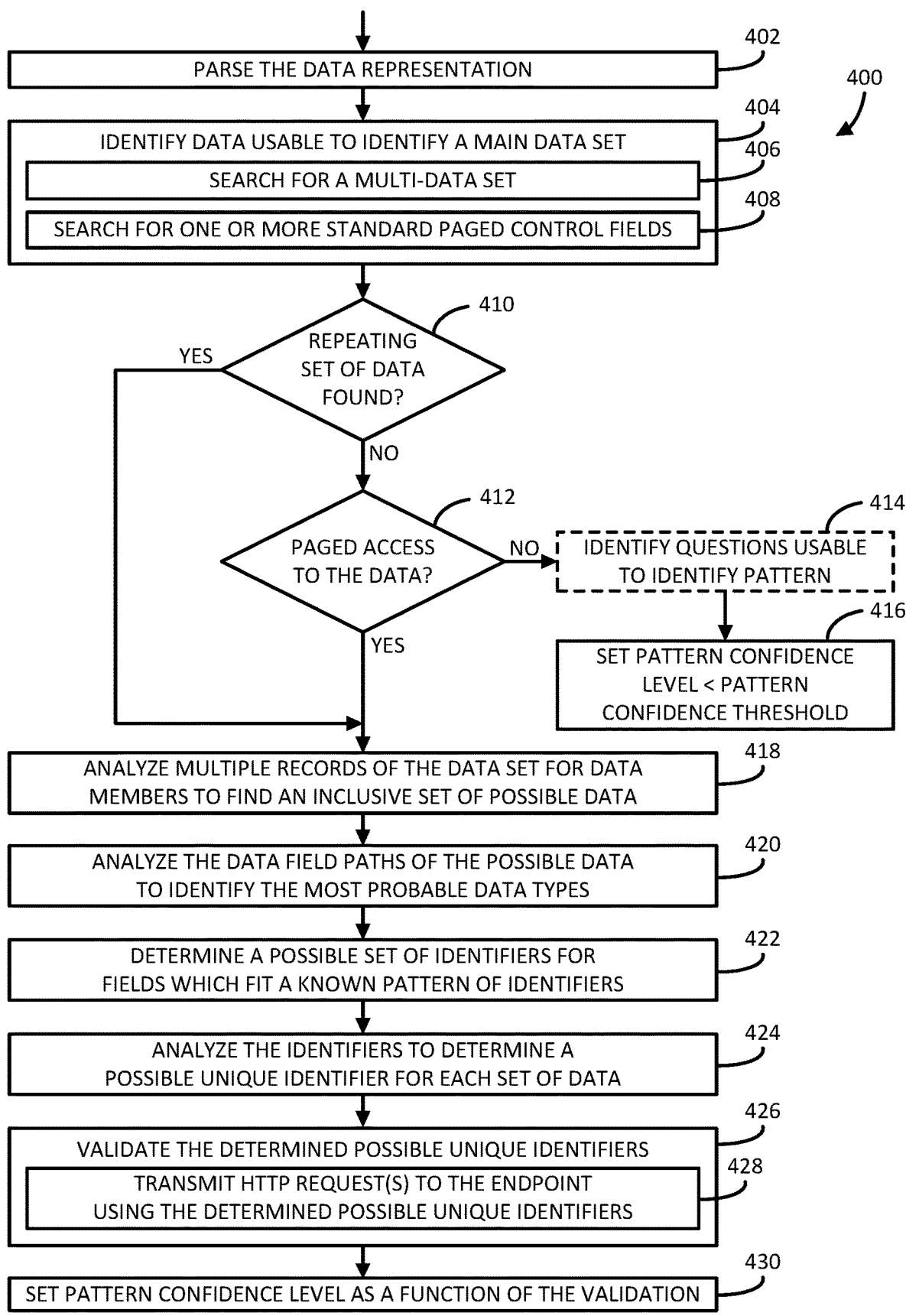
FIG. 4 is a simplified flow diagram of at least one embodiment of a method for analyzing a data representation to determine a pattern that may be executed by the remote computing device of FIGS. 1 and 2.

Upon receiving the URL, the data analysis platform 116 of the provider computing device 110 is configured to transmit a request (e.g., using an HTTP method) based on the URL and analyze the data representation received with the response to the request (see, e.g., the method 300 of FIGS. 3A-3B and the method 400 of FIG. 4 for further detail). During the analysis, the data analysis platform 116 is configured to determine one or more possible schemas for the data being accessed via the REST interface 128. It should be appreciated that the schemas may be used to identify data types, identifiers, and data members such that the integrator can rely on the schema in their application integration solution 104 when making calls to the network application 112. For example, a definition may be generated and used by the network application 112 to connect to the REST interface and bring the necessary data into the environment of the network application 112 for use in workflows, user interfaces, analytic calculations, etc.

The integration computing device 102, the provider computing device 110, and the 3rd party provider computing device 124 may each be embodied as any type of computing device 132 capable of performing the respective functions described herein. For example, the integration computing device 102, the provider computing device 110, and the 3rd party provider computing device 124 may each be embodied as, but are not limited to, one or more servers (e.g., stand-alone, rack-mounted, etc.), compute devices, storage devices, desktop computers, and/or combination of compute blades and data storage devices (e.g., of a storage area network (SAN)) in a cloud architected network or data center.

As such, while each of the integration computing device 102, the provider computing device 110, and the 3rd party provider computing device 124 are illustrated as a single computing device 132, it should be appreciated that, in some embodiments, any of the integration computing device 102, the provider computing device 110, and/or the 3rd party provider computing device 124 may include more than one computing device 132 (e.g., in a distributed computing architecture), each of which may be usable to perform at least a portion of the functions described herein of the respective computing device 132. For example, in some embodiments, the network application 112 may be executed on one or more computing devices 132, while the data analysis platform 116 may be executed on one or more other computing devices 132.

Figure 2:
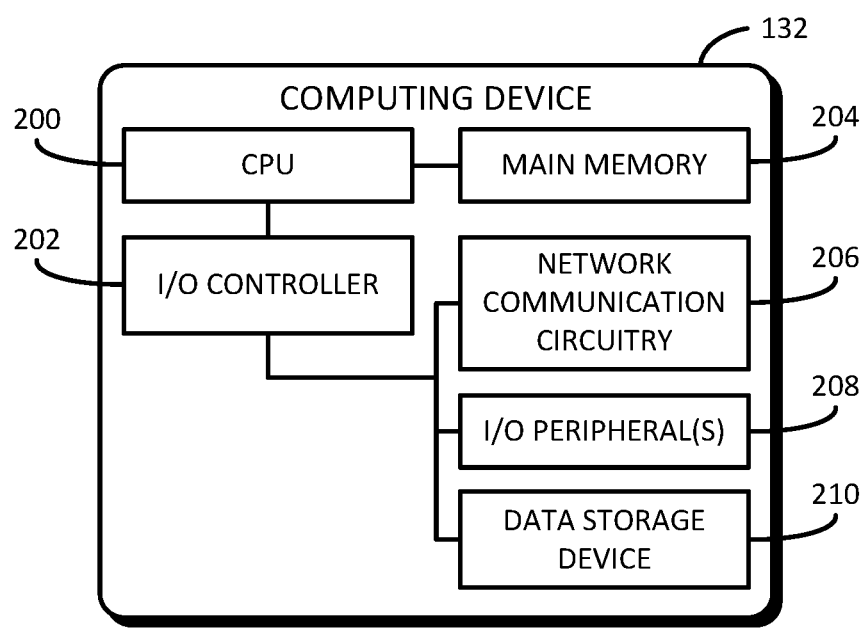
FIG. 2 is a simplified block diagram of at least one embodiment of the client and remote computing devices of the system of FIG. 1.

Referring now to FIG. 2, an illustrative computing device 132 (e.g., the integration computing device 102, the provider computing device 110, and/or the 3rd party provider computing device 124) includes a central processing unit (CPU) 200, an input/output (I/O) controller 202, a main memory 204, network communication circuitry 206, one or more I/O peripherals 208, and a data storage device 212. In some alternative embodiments, the computing device 132 may include additional, fewer, and/or alternative components to those of the illustrative computing device 132, such as a graphics processing unit (GPU). It should be appreciated that one or more of the illustrative components may be combined on a single system-on-a-chip (SoC) on a single integrated circuit (IC).

Additionally, it should be appreciated that the type of components and/or hardware/software resources of the respective computing device 132 may be predicated upon the type and intended use of the respective computing device 132. It should be further appreciated that in such embodiments in which one of the computing devices 132 includes more than one computing device, one or more computing devices may be configured as a database server with less compute capacity and more storage capacity relative to another of the computing devices. Similarly, one or more other computing devices may be configured as an application server with more compute capacity relative and less storage capacity relative to another of the computing devices.

The CPU 200, or processor, may be embodied as any combination of hardware and circuitry capable of processing data. In some embodiments, the computing device 132 may include more than one CPU 200. Depending on the embodiment, the CPU 200 may include one processing core (not shown), such as in a single-core processor architecture, or multiple processing cores, such as in a multi-core processor architecture. Irrespective of the number of processing cores and CPUs 200, the CPU 200 is capable of reading and executing program instructions. In some embodiments, the CPU 200 may include cache memory (not shown) that may be integrated directly with the CPU 200 or placed on a separate chip with a separate interconnect to the CPU 200. It should be appreciated that, in some embodiments, pipeline logic may be used to perform software and/or hardware operations (e.g., network traffic processing operations), rather than commands issued to/from the CPU 200.

The I/O controller 202, or I/O interface, may be embodied as any type of computer hardware or combination of circuitry capable of interfacing between input/output devices and the computing device 132. Illustratively, the I/O controller 202 is configured to receive input/output requests from the CPU 200, and send control signals to the respective input/output devices, thereby managing the data flow to/from the computing device 132.

The memory 204 may be embodied as any type of computer hardware or combination of circuitry capable of holding data and instructions for processing. Such memory 204 may be referred to as main or primary memory. It should be appreciated that, in some embodiments, one or more components of the computing device 132 may have direct access to memory, such that certain data may be stored via direct memory access (DMA) independently of the CPU 200.

The network communication circuitry 206 may be embodied as any type of computer hardware or combination of circuitry capable of managing network interfacing communications (e.g., messages, datagrams, packets, etc.) via wireless and/or wired communication modes. Accordingly, in some embodiments, the network communication circuitry 206 may include a network interface controller (NIC) capable of being configured to connect the computing device 132 to a computer network, as well as other devices, depending on the embodiment.

The one or more I/O peripherals 208 may be embodied as any auxiliary device configured to connect to and communicate with the computing device 132. For example, the I/O peripherals 208 may include, but are not limited to, a mouse, a keyboard, a monitor, a touchscreen, a printer, a scanner, a microphone, a speaker, etc. Accordingly, it should be appreciated that some I/O devices are capable of one function (i.e., input or output), or both functions (i.e., input and output). The illustrative I/O peripherals 208 includes a display, which may be embodied as a touchscreen display capable of receiving user input via touch (e.g., one or more fingers, a stylus, etc.).

In some embodiments, the I/O peripherals 208 may be connected to the computing device 132 via a cable (e.g., a ribbon cable, a wire, a universal serial bus (USB) cable, a high-definition multimedia interface (HDMI) cable, etc.) of the computing device 132. In such embodiments, the cable may be connected to a corresponding port (not shown) of the computing device 132 for which the communications made therebetween can be managed by the I/O controller 202. In alternative embodiments, the I/O peripherals 208 may be connected to the computing device 132 via a wireless mode of communication (e.g., Bluetooth®, Wi-Fi®, etc.) which can be managed by the network communication circuitry 206.

The data storage device 212 may be embodied as any type of computer hardware capable of the non-volatile storage of data (e.g., semiconductor storage media, magnetic storage media, optical storage media, etc.). Such data storage devices 212 are commonly referred to as auxiliary or secondary storage, and are typically used to store a large amount of data relative to the memory 204 described above.

Referring back to FIG. 1, as described previously, the integration computing device 102 includes an application integration solution 104 and a client integration builder interface 106. The application integration solution 104 may be embodied as any type of network-based software application (e.g., thin/zero client, cloud application, network application, software-as-a-service (SaaS) application, etc.) configured to communicate with the provider computing device 110 in a client-server relationship over the network 108. As described previously, the application integration solution 104 is configured to serve as a software-based interface between a user (e.g., via a graphical user interface (GUI) of the application integration solution 104) and the user's access computing device (e.g., desktop, mobile computing device, server, etc.), which is configured to access the network application 112. The client integration builder interface 106 may be embodied as any type of interface usable to communicate with the provider integration builder interface 114 of the provider computing device 110, such as a web browser, a client portal, a module of the network application 112, etc.

The network 108 may be implemented as any type of wired and/or wireless network, including a local area network (LAN), a wide area network (WAN), a global network (the Internet), etc. Accordingly, the network 116 may include one or more communicatively coupled network computing devices (not shown) for facilitating the flow and/or processing of network communication traffic via a series of wired and/or wireless interconnects. Such network computing devices may include, but are not limited to, one or more access points, routers, switches, servers, compute devices, storage devices, etc.

As described previously, the provider computing device 110 includes the network application 112 and the data analysis platform 116. The network application 112 may be embodied as any type of network-based software application (e.g., thin/zero client, cloud application, network application, software-as-a-service (SaaS) application, etc.) configured to communicate with a computing device (not shown) executing the application integration solution 104 in a client-server relationship over the network 108. The illustrative network application 112 includes the provider integration builder interface 114. The provider integration builder interface 114 may be embodied as any type of interface usable to perform the functions described herein, such as, but not limited to, portal, a module of the network application 112, etc. It should be appreciated that, in some embodiments, the provider integration builder interface 114 may not be an interface of the network application 112. In such embodiments, the provider integration builder interface 114 may be a standalone interface, a component of the data analysis platform 116, or a component of another application of the provider computing device 110.

The data analysis platform 116 may be embodied as any combination of hardware, firmware, software, or circuitry usable to perform the functions described herein. The illustrative data analysis platform 116 includes a pattern determiner 118 and a data analyzer 120 each of which may be embodied as any type of firmware, hardware, software, circuitry, or combination thereof that is configured to perform the functions described herein. In some embodiments, the pattern determiner 118 and/or the data analyzer 120 may include one or more computer-readable medium (e.g., the memory 204, the data storage device 210, and/or any other media storage device) having instructions stored thereon and one or more processors (e.g., the CPU 200) coupled with the one or more computer-readable medium and configured to execute instructions to perform the functions described herein.

The pattern determiner 118, which may be embodied as any type of firmware, hardware, software, circuitry, or combination thereof, is configured to determine one or more patterns as a function of the analysis performed on the data representation(s), such as may be performed by the data analyzer. To do so, the pattern determiner 118 is configured to generate an HTTP request (e.g., an HTTP GET request) based on the URL of the Web service endpoint received by the network application integrator.

The pattern determiner 118 is additionally configured to, subsequent to the analysis having been performed, retrieve a confidence level of the pattern and compare the confidence level to a confidence threshold (i.e., a pattern confidence threshold). If the level of confidence in the pattern meets or exceeds the threshold, the pattern determiner 118 is configured to identify one or more key values based on the identified pattern. Additionally, the pattern determiner 118 is configured to generate one or more possible schemas for the REST interface 128 that are usable to generate a definition usable by the network application 112 to connect to the REST interface 128 and retrieve representations of data therefrom.

The pattern determiner 118 is further configured to identify one or more questions usable to increase the confidence level of the pattern, should the pattern determiner 118 determine that the retrieved confidence level of the pattern is not greater than or equal to the confidence threshold (i.e., the pattern confidence threshold). Additionally, the pattern determiner 118 is configured to prompt the network application integrator to answer the identified question(s) such that a further analysis can be performed in light of the answers received from the network application integrator (e.g., as may be performed by the data analyzer 120).

Under certain conditions, a pattern may not be determinable or the confidence level of the pattern updated upon further analysis as a function of the answered question(s) may not be greater than or equal to the corresponding pattern confidence threshold. Accordingly, under such conditions, the pattern determiner 118 may be configured to retrieve the data using a brute force technique, returning a larger data set than would otherwise be returned in the course of the prior analysis, and analyze the retrieved data set to identify one or more key values for the returned data set to generate one or more possible schemas for retrieving data from the REST interface 128.

The data analyzer 120, which may be embodied as any type of firmware, hardware, software, circuitry, or combination thereof, is configured to analyze the data representations to determine a pattern of the data. The data analyzer 120 is additionally configured to determine a confidence level of the pattern (i.e., a pattern confidence level). The pattern confidence level may be defined as any amount (e.g., a percentage, a numerical value between X and Y in which X and Y are integer values greater than 0, etc.) usable to convey a level of confidence in the determined pattern. In some embodiments, one or more aspects of the pattern may be weighted relative to the other aspects of the pattern. Example aspects may include, but are not limited to, data types, identifiers, data members, etc.

Under certain conditions, the determined pattern confidence level may not meet or exceed a corresponding pattern confidence threshold. Accordingly, the data analyzer 120 is further configured to analyze the representations to determine a pattern of the data in light of one or more answers to questions asked of the network application integrator (e.g., as may be received by the pattern determiner 118). It should be appreciated that, in some embodiments, the data analyzer 120 may be configured to determine the one or more questions corresponding to the one or more answers during the analysis of the data. It should be further appreciated that, in some embodiments, the data analyzer 120 may be configured to determine more than one possible pattern. Accordingly, in such embodiments, the data analyzer 120 may be configured to determine a pattern confidence level for each possible pattern identified.

Referring now to FIGS. 3A and 3B, an illustrative method 300 is provided for automatically discovering and connecting to a REST interface that may be executed by a Web service provider computing device (e.g., the provider computing device 110 of FIG. 1), or more particularly by the data analysis platform 116 of the provider computing device 110. The method 300 begins in block 302, in which the data analysis platform 116 determines whether it has received a URL, or URI, depending on the embodiment, from a user. It should be appreciated that the URL corresponds to an endpoint of a Web service known to the user, but for which the schema (i.e., the organization of the data) is unknown.

If the URL of the Web service endpoint has been received in block 302, the method 300 advances to block 304, in which the data analysis platform 116 generates an HTTP request with an HTTP method (e.g., GET, POST, etc.) as a function of the received Web service endpoint URL received in block 302. In block 306, the data analysis platform 116 transmits the generated HTTP request to the Web service endpoint URL. In block 308, the data analysis platform 116 determines whether a response to the HTTP request has been received. If so, the method 300 advances to block 310, in which the data analysis platform 116 analyzes a data representation of the received response (see, e.g., the method 400 of FIG. 4 for an illustrative analysis) to determine a pattern within the returned data representation. As described previously, the data representation may be formatted using JSON, XML, HTML, or any other applicable format usable for data exchange between Web services.

In block 312, the data analysis platform 116 retrieves a confidence level of the determined pattern (i.e., a pattern confidence level) based on a result of the analysis, such as may be determined as a function of the analysis. In block 314, the data analysis platform 116 compares the pattern confidence level retrieved in block 312 against a predetermined pattern confidence threshold. As described previously, the pattern confidence level may be defined as any amount (e.g., a percentage, a numerical value between X and Y in which X and Y are integer values greater than 0, etc.) usable to convey a level of confidence in the pattern. In some embodiments, one or more aspects of the pattern may be weighted relative to the other aspects of the pattern. Such aspects may include data types, identifiers, data members, etc.

If the data analysis platform 116 determines that the pattern confidence level is not greater than or equal to (i.e., is less than) the pattern confidence threshold, the method 300 branches to block 320 shown in FIG. 3B, which is described below. Otherwise, if the data analysis platform 116 determines that the pattern confidence level is not greater than or equal to (i.e., is less than) the pattern confidence threshold, the method 300 branches to block 316. In block 316, the data analysis platform 116 identifies one or more key values for the returned data set as a function of the pattern retrieved in block 312. In block 318, the data analysis platform 116 generates one or more schemas for the desired Web service interface (i.e., associated with the URL of block 302) as a function of the identified key values, the determined pattern, and the returned data. It should be appreciated that, in some embodiments, the proposed schema(s) may be presented to the integrator (e.g., via the provider integration builder interface 114) with a range of configuration option to try and use a data explore mode for an integrator to test against (e.g., to determine whether using a proposed schema yields the expected data).

Referring back to block 314, as described previously, if the data analysis platform 116 determines that the pattern confidence level is not greater than or equal to the pattern confidence threshold, the method 300 branches to block 320. In block 320, the data analysis platform 116 determines one or more questions usable to increase the pattern confidence level to an acceptable level (i.e., greater than the pattern confidence threshold). The questions may include any inquiry that can be answered by the integrator to better analyze the data and determine a pattern. For example, such questions may include whether an identified attribute wrong, whether an identified attribute wrong, whether the data of the URL can even be queried, etc. In some embodiments, the questions may be presented from a list of predefined questions determined as needing answered during the analysis performed in block 310. In block 322, the data analysis platform 116 prompts the user to answer the identified question(s).

In block 324, the data analysis platform 116 determines the user has answered all of the questions. If so, the method 300 advances to block 326, in which the data analysis platform 116 analyzes the data representation received in block 308 as a function of the received answer(s) to determine a pattern or update the previously determined pattern (i.e., the pattern determined in block 310. In block 328, the data analysis platform 116 retrieves an updated confidence level of the pattern that was determined as a function of the analysis performed in block 326. In block 330, the data analysis platform 116 determines whether the updated pattern confidence level is greater than or equal to the pattern confidence threshold. If so, the method 300 branches to block 316, in which, as described previously, the data analysis platform 116 identifies one or more key values for the returned data set as a function of the pattern determined in block 326. Otherwise, if the data analysis platform 116 determines that the updated pattern confidence level is less than the pattern confidence threshold, the method 300 branches to block 332.

In block 332, the data analysis platform 116 retrieves data associated with the URL received in block 302 using brute force. As such, a larger data set is returned than would otherwise be preferred. In block 334, the data analysis platform 116 filters and analyzes the data set retrieved using the brute force method in block 332. In block 336, the data analysis platform 116 identifies any key values for the returned data set as a function of a result of the analysis performed in block 334. In block 338, the data analysis platform 116 generates one or more schemas for the Web service interface associated with the URL as a function of the identified key values and the retrieved data.

Referring now to FIG. 4, an illustrative method 400 is provided for automatically discovering and connecting to a REST interface (e.g., the REST interface 128 of FIG. 1) that may be executed by a Web service provider computing device (e.g., the provider computing device 110 of FIG. 1), or more particularly by the data analysis platform 116 of the provider computing device 110. As described previously, the data analysis platform 116 includes a pattern determiner 118 and a data analyzer 120. Accordingly, at least a portion of the blocks of the method 400 as described herein may be performed by the pattern determiner 118 and/or the data analyzer 120.

As also described previously, the illustrative method 400 may be performed as at least a portion of one or more blocks of the method 300 of FIG. 3 described previously (e.g., in block 310, block 326, etc.). It should be appreciated that, prior to the method 400 being initiated, a URL was received from the network application integrator, an initial HTTP request (e.g., an HTTP GET request generated as a function of the received URL) was previously transmitted to the Web service endpoint, and a response that included a representation of the requested data (i.e., a data representation) was received in the response.

The method 400 begins in block 402, in which the data analysis platform 116 parses the data representation, such that the resulting data set can be analyzed. In block 404, the data analysis platform 116 searches for data usable to identify a main data set. To do so, in block 406, the data analysis platform 116 searches for a repeating set of data in the parsed result of the received data representation. For example, the repeating set of data may include any multi-value set, such as an array, a list, a map (e.g., in which the identifiers are the attribute names), etc. It should be appreciated that, in some embodiments, the repeating set of data may be contained in a single record. Additionally, in block 408, the data analysis platform 116 searches for one or more standard paged control fields, such as a count, a number, an offset, a start, an end, etc. For example, the data analysis platform 116 may determine whether the data returned a record with one or more standard paged control fields, and an inner array of data that is the result.

In block 410, the data analysis platform 116 determines whether the search yielded a repeating set of data. If so, the method 400 jumps to block 418, which is described below; otherwise, if the data analysis platform 116 determines that the search did not uncover a repeating set of data, the method 400 advances to block 412. In block 412, the data analysis platform 116 determines whether the search returned an indication that the endpoint supports paged access to the data. If the search returned an indication that the endpoint supports paged access to the data, the method 400 jumps to block 418, which is described below. Otherwise, the method 400 branches to block 414.

In block 414, in some embodiments, the data analysis platform 116 may be configured to identify one or more questions usable to identify the pattern. As described previously, the questions may prompt the integrator to respond as to whether an identified attribute wrong, whether an identified attribute wrong, whether the data of the URL can even be queried, etc. In some embodiments, the questions may be selected from a list of predefined questions. Additionally, in block 416, the data analysis platform 116 sets the pattern confidence level to an amount less than the pattern confidence threshold. Accordingly, the data analysis platform 116 can take the necessary steps to get the question(s) answered.

It should be appreciated that the data which does not include a multi-data set and does not include any indication that the data is paged may be a single record. Accordingly, under such conditions, prior to identifying the one or more questions in block 414, the data analysis platform 116 may be configured to determine if the data is actually a single record, and the result might be a high confidence that the URL just returns a single value. To do so, the data analysis platform 116 may be configured to determine whether a possible identifier in the record matches a value in the URL. If so, it can be inferred that this is a key, or one of multiple keys, usable to fetch other records of this type, such as may be retrieved using an input parameter of the key of the single record. Additionally, if confidence is high that the REST interface 128 returns only a single record in response to the request, the data analysis platform 116 may be configured to attempt to work with just a single row, and validate whether the assumption is correct before identifying the one or more questions for clarification or confirmation from the integrator as performed in block 414.

As described previously, if the data analysis platform 116 determines the search yielded a repeating set of data in block 408 or that the endpoint supports paged access to the data in block 412, the method 400 branches to block 418. In block 418, the data analysis platform 116 analyzes multiple records of the data set (e.g., the repeating data set or the paged data set) for data members to find an inclusive set of possible data. For example, the records may be analyzed to determine whether a known field (e.g., "result") has a multi-data set with many members, which would increase the probability that the field includes data of interest. In block 420, the data analysis platform 116 analyzes the data representation and data field paths to identify the most probable data types of the possible data. For example, the analysis may include determining whether the data type is a particular kind of data item as defined by the values the data type can take, such as numeric, Boolean, UUID, mixed case (e.g., a name), fixed set of values (e.g., an enumeration ("M", "F")), etc.

In block 422, the data analysis platform 116 determines a possible set of identifiers based on those fields which fit the pattern of identifiers. In other words, the data is analyzed to determine whether something in the data looks like it is unique for each of the values. For example, a field name may raise the confidence level, but if the value for the field repeats, then it is clearly not an identifier. It should be appreciated that the unique identifier may require using multiple fields, in some embodiments. In block 424, the data analysis platform 116 analyzes the identifiers to determine a possible unique identifier for each set of data. For example, a field (e.g., "SelfUrl") may point to a specific piece of data, which may raise the confidence level that the field is an identifier.

In block 426, the data analysis platform 116 validates the determined possible unique identifier(s). To do so, in block 428, the data analysis platform 116 transmits one or more HTTP requests (e.g., HTTP GET request, HTTP POST request, etc.) to the endpoint of the REST interface 128 using the determined possible unique identifiers and analyzes the returned data representations. In an illustrative example, the data analysis platform 116 may transmit an HTTP GET request to then endpoint and compare the returned data record to the data record from the initial request to determine whether they match, thereby providing a high confidence that the identifier used is declared and that the GET pattern (e.g., GET ONE) for the endpoint is also declared. In block 430, the data analysis platform 116 sets a confidence level of the pattern (i.e., a pattern confidence level) as a function of the validation performed in block 426.

It should be appreciated that the confidence levels described in the methods 300 and 400 may be assigned at multiple levels of the proposed schema to indicate a confidence of identified data types, identifiers, data members, etc. It should be further appreciated that while the REST interface 128 of the Web service 126 has been described as a RESTful interface, the analysis performed herein may be extended to XML and/or HTML web pages, in some embodiments.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A method for automatic discovery and connection to a representational state transfer (REST) interface, the method comprising:

analyzing, by a provider computing device, a data representation received from a REST interface of a Web service in response to having transmitted an HTTP request to an endpoint of the Web service, wherein a schema of the endpoint is unknown;

determining, by the provider computing device, a pattern of the data representation as a function of the analysis of a repeating set of data in the data representation;

assigning, by the provider computing device, levels of confidence in the pattern as a function of the analysis of the data representation and the determined pattern, wherein:

the assigning the levels of confidence in the pattern as the function of the analysis of the data representation and the determined pattern includes weighting at least a first aspect of the pattern in relation to a second aspect of the pattern; and the levels of confidence are assigned at a plurality of levels for identified data;

determining, by the provider computing device, that the assigned levels of confidence in the pattern are greater than or equal to a corresponding confidence threshold;

in response to determining that the levels of confidence in the pattern are greater than or equal to the corresponding confidence threshold, identifying, by the provider computing device, one or more key values for the data representation, wherein the identifying the one or more key values is based on the determined pattern; and in response to identifying the one or more key values, generating, by the provider computing device, one or more possible schemas for the data representation received from the REST interface of the Web service as a function of the determined pattern and the identified key values.

2. The method of claim 1, wherein the first aspect and the second aspect of the pattern each comprises at least one of a data type, an identifier, and a data member.

3. The method of claim 1, wherein analyzing the data representation comprises (i) identifying data of the data representation that is usable to identify a main data set, (ii) analyzing multiple records of the data set for data members to find an inclusive set of possible data, and (iii) analyzing data field paths of the data to determine one or more probably data types usable to identify the main data set.

4. The method of claim 3, wherein identifying data of the data representation that is usable to identify the main data set comprises searching for a repeating set of data in the data representation.

5. The method of claim 3, wherein identifying data of the data representation that is usable to identify the main data set comprises searching for one or more standard paged control fields.

6. The method of claim 3, wherein analyzing the data representation further comprises determining a possible set of identifiers based on data fields which fit a known pattern of identifiers and analyzing the identifiers to determine a possible unique identifier for each set of data.

7. The method of claim 6, wherein analyzing the data representation further comprises validating the determined possible unique identifiers.

8. The method of claim 7, wherein validating the determined possible unique identifiers comprises transmitting one or more additional HTTP requests to the endpoint of the Web service based on the determined possible unique identifiers and analyzing the returned data representations associated with the one or more additional HTTP requests.

9. The method of claim 1, wherein the HTTP request comprises one of an HTTP GET request and an HTTP POST request;

further comprising:

determining, by the provider computing device and in response to a first determination that the levels of confidence in the pattern are less than the corresponding confidence threshold, one or more questions usable to increase the levels of confidence in the pattern;

generating, by the provider computing device, a prompt for delivery to a user to answer the one or more questions; and receiving, by the provider computing device, answers to the one or more questions from the user;

wherein the determining, by the provider computing device, the pattern of the data representation is repeated is repeated so that the pattern is determined as a function of the analysis of the repeating set of data in the data representation and the received answers to the one or more questions.

10. A provider computing device for automatic discovery and connection to a representational state transfer (REST) interface, the provider computing device comprising:

one or more non-transitory computer-readable media comprising instructions;

one or more processors coupled with the one or more non-transitory computer-readable media and configured to execute the instructions to:

analyze a data representation received from a REST interface of a Web service in response to having transmitted an HTTP request to an endpoint of the Web service, wherein a schema of the endpoint is unknown;

determine a pattern of the data representation as a function of the analysis of a repeating set of data in the data representation;

assign levels of confidence in the pattern as a function of the analysis of the data representation and the determined pattern, wherein:

the assigning the levels of confidence in the pattern as the function of the analysis of the data representation and the determined pattern includes weighting at least a first aspect of the pattern in relation to a second aspect of the pattern; and the levels of confidence are assigned at a plurality of levels for identified data;

determining that the assigned levels of confidence in the pattern are greater than or equal to a corresponding confidence threshold;

in response to determining that the levels of confidence in the pattern are greater than or equal to a corresponding confidence threshold, identifying one or more key values for the data representation, wherein the identifying the one or more key values is based on the determined pattern; and in response to identifying the one or more key values, generate, one or more possible schemas for the data representation received from the REST interface of the Web service as a function of the determined pattern and the identified key values.

11. The provider computing device of claim 10, wherein the first aspect and the second aspect of the pattern each comprises at least one of a data type, an identifier, and a data member.

12. The provider computing device of claim 10, wherein to analyze the data representation comprises to (i) identify data of the data representation that is usable to identify a main data set, (ii) analyze multiple records of the data set for data members to find an inclusive set of possible data, and (iii) analyze data field paths of the data to determine one or more probably data types usable to identify the main data set.

13. The provider computing device of claim 12, wherein to identify data of the data representation that is usable to identify the main data set comprises to search for a repeating set of data in the data representation.

14. The provider computing device of claim 12, wherein to identify data of the data representation that is usable to identify the main data set comprises to search for one or more standard paged control fields.

15. The provider computing device of claim 12, wherein to analyze the data representation further comprises to determine a possible set of identifiers based on data fields which fit a known pattern of identifiers and analyze the identifiers to determine a possible unique identifier for each set of data.

16. The provider computing device of claim 15, wherein to analyze the data representation further comprises to validate the determined possible unique identifiers.

17. The provider computing device of claim 16, wherein to validate the determined possible unique identifiers comprises to transmit one or more additional HTTP requests to the endpoint of the Web service based on the determined possible unique identifiers and analyze the returned data representations associated with the one or more additional HTTP requests.

18. The provider computing device of claim 10, wherein the HTTP request comprises one of an HTTP GET request and an HTTP POST request;

wherein the one or more processors are coupled with the one or more non-transitory computer-readable media and further configured to execute the instructions to:

determine, in response to a first determination that the levels of confidence in the pattern are less than the corresponding confidence threshold, one or more questions usable to increase the levels of confidence in the pattern;

generate a prompt for delivery to a user to answer the one or more questions; and receive answers to the one or more questions from the user;

wherein the determining the pattern of the data representation is repeated so that the pattern is determined as a function of the analysis of the repeating set of data in the data representation and the received answers to the one or more questions.

* * * * *